US011435004B2

(12) United States Patent
Cupit (10) Patent No.: US 11,435,004 B2
(45) Date of Patent: Sep. 6, 2022

(54) SHUT-OFF VALVE (71) Applicant: ICON TECHNOLOGY SYSTEMS LIMITED, Altrincham (GB)

(72) Inventor: David Cupit, Altrincham (GB)

(73) Assignee: ICON TECHNOLOGY SYSTEMS LIMITED, Altrincham (GB)

(*) Notice: Subject to any disclaimer, the term of this patent is extended or adjusted under 35 U.S.C. 154(b) by 0 days.

(21) Appl. No.: 16/341,421

(22) PCT Filed: Oct. 10, 2017

(86) PCT No.: PCT/GB2017/053061
§ 371 (c)(1),
(2) Date: Apr. 11, 2019

(87) PCT Pub. No.: WO2018/069693
PCT Pub. Date: Apr. 19, 2018

(65) Prior Publication Data
US 2020/0041019 A1    Feb. 6, 2020

(30) Foreign Application Priority Data

Oct. 11, 2016   (GB) .................................. 1617257

(51) Int. Cl.
*F16K 31/00*     (2006.01)
(52) U.S. Cl.
CPC .................... *F16K 31/001* (2013.01)
(58) Field of Classification Search
CPC ............................... F16K 31/001; E03B 7/071
USPC ................... 122/507; 137/456, 467
See application file for complete search history.

(56) References Cited

U.S. PATENT DOCUMENTS

| 3,204,872 A | 9/1965 | Whear |
| 4,696,319 A * | 9/1987 | Gant ................... A01G 25/167 |
| | | 137/78.3 |
| 4,739,789 A | 4/1988 | Hamilton |

(Continued)

FOREIGN PATENT DOCUMENTS

| EP | 2353693 A1 | 8/2011 |
| EP | 3526501 A1 | 8/2019 |

(Continued)

OTHER PUBLICATIONS

Machine translation of KR20090080398A (Year: 2009).*

(Continued)

*Primary Examiner* — Michael R Reid
(74) *Attorney, Agent, or Firm* — Womble Bond Dickinson-US LLP (57)   ABSTRACT

A shut-off valve (10) comprises a valve housing (12, 14) having a valve inlet (28), a valve outlet (30), a fluid flow channel (32) extending between the valve inlet and the valve outlet, a valve closure member (34) displaceable into the fluid flow channel to prevent fluid flow through the flow channel and a volume within the housing for receiving a compressed absorbent body (42) which expands when in contact with liquid. The compressed absorbent body (42) is configured to displace the valve closure member (34) into the fluid flow channel (32) when expanded, and the housing (12, 14) comprises a closable aperture (52) which allows access to the volume for replacing the absorbent body.

21 Claims, 10 Drawing Sheets

(56) References Cited

U.S. PATENT DOCUMENTS

| | | | |
|---|---|---|---|
| 5,694,970 A * | 12/1997 | Staranchuk | D06F 39/081 |
| | | | 122/504 |
| 8,371,325 B1 | 2/2013 | Grizzle | |
| 2010/0269916 A1* | 10/2010 | Hur | E03B 7/071 |
| | | | 137/312 |

FOREIGN PATENT DOCUMENTS

| | | | |
|---|---|---|---|
| KR | 20090080398 A * | 7/2009 | |
| WO | 2018069693 A1 | 4/2018 | |

OTHER PUBLICATIONS

International Search Report dated Jan. 17, 2018 in application No. PCT/GB2017/053061 filed Oct. 10, 2017.
The International Preliminary Report on Patentablity of the international Bureau of WIPO for PCT Application No. PCT/GB2017/053061 dated Apr. 16, 2019, 5 pages.
The Written Opinion of the International Searching Authority for PCT Application No. PCT/GB2017/053061 dated Jan. 17, 2018, 4 pages.
Communication pursuant to Article 94(3) EPC for EP Application No. 17 787 544.0 dated Jan. 24, 2020, 4 pages.
Communication pursuant to Article 94(3) EPC for EP Application No. 17 787 544.0 dated Nov. 24, 2020, 4 pages.

* cited by examiner

SHUT-OFF VALVE

CROSS-REFERENCE TO RELATED APPLICATIONS

This patent application is a U.S. National Phase Application under 35 U.S.C. § 371 of International Application No. PCT/GB2017/053061, filed 10 Oct. 2017, entitled SHUT-OFF VALVE, which claims priority to Great Britain Patent Application No. 1617257.9, filed 11 Oct. 2016.

The present invention relates to shut-off valves, and in particular to shut-off valves for shutting off a flow of fluid in the event of a leak.

EP 2353693 A discloses a shut-off valve comprising a housing having a fluid inlet, fluid outlet and a fluid flow path extending between the fluid inlet and the fluid outlet. A compressed absorbent body is located within the housing, which expands when it comes into contact with water. When the compressed absorbent body expands, it displaces a plunger into the fluid flow path and stops the flow of water out of the valve.

After the compressed body has expanded, in order for the valve to be operational again it is necessary to dismantle the valve, replace the expanded body with an unexpanded compressed body and reassemble the valve.

It is an object of the present invention to provide a shut-off valve of the type described above, which facilitates the removal and replacement of an absorbent body after it has been exposed to water.

In accordance with the present invention, a shut-off valve comprises a valve housing having a valve inlet, a valve outlet, a fluid flow channel extending between the valve inlet and the valve outlet, a valve closure member displaceable into the fluid flow channel to prevent fluid flow through the flow channel and a volume within the valve housing for receiving a compressed absorbent body which expands when in contact with liquid and which is configured to displace the valve closure member into the fluid flow channel when expanded, the housing comprising a closable aperture which allows access to the volume for replacing the absorbent body.

By providing the housing with a closable aperture, it is possible to remove an expanded absorbent body after exposure to liquid following a leak, and to replace it with an unexpanded absorbent body, without requiring dismantling and reassembly of the housing.

In a preferred embodiment, the housing comprises a side wall portion which is displaceable in order to open and close the aperture.

In this way, when it becomes necessary to replace an absorbent body, typically after it has become expanded after contact with water, the side wall portion can be opened to allow the expanded absorbent body to be removed and for it to be replaced with a compressed, unexpanded absorbent body. The side wall portion can then be re-closed. The replacement of the absorbent body can thereby be quickly and simply achieved, without the need to dismantle the valve.

Preferably, the displaceable side wall portion comprises support means for a compressed absorbent body.

By providing the displaceable side wall portion with support means for a compressed absorbent body, opening the side wall portion facilitates removal of expanded absorbent body. Similarly, a replacement, unexpanded compressed absorbent body can be placed on the support means whereby re-closing of the side wall portion positions the replacement body within the housing.

Preferably, the support means is configured to engage the periphery of a compressed absorbent body, and in a preferred embodiment the support means is annular.

In one embodiment, the side wall portion is pivotally mounted.

Preferably, the undersurface of the housing is open. In the event of a leak, an open undersurface of the housing allows water to contact the compressed absorbent body quickly, thereby allowing the valve to carry out its shut-off function.

In one embodiment, the undersurface of the housing is open and the displaceable side wall portion is complementarily-shaped with the open portion of the undersurface of the housing.

This helps to retain the displaceable side wall portion in the closed position.

Preferably, the shut-off valve further comprises biasing means, e.g. a spring, for biasing the valve closure member away from the fluid flow channel.

The valve closure member may conveniently comprise a plunger.

Preferably, the plunger is slidably disposed in a bore in the housing.

The valve may further comprise a plate member secured to the valve closure member. The provision of a plate member provides a larger surface area with which the absorbent body can come into contact when it expands.

In one embodiment, the valve comprises first and second housing portions, for example an upper housing portion secured to a lower housing portion.

In one embodiment, the valve inlet, the valve outlet and the fluid flow channel are located in the upper housing portion.

In one embodiment, the volume for receiving a compressed absorbent body and the closable aperture are in the lower housing portion.

In another embodiment, the valve housing comprises a single housing portion.

The shut-off valve may further comprise means for displacing the valve closure member out of the fluid flow channel. This assists in resetting the valve to its open position, in which fluid is permitted to flow through the valve, since the valve can become stuck in the closed, shut-off position in certain circumstances.

The means for displacing the valve closure member out of the fluid flow channel preferably comprises a member extending through the valve housing and displaceable with respect to the valve housing.

Preferably, the means for displacing the valve closure member is displaceable manually.

Preferably, the member extending through the valve housing is displaced outwardly on displacement of the valve closure member into the fluid flow channel.

In a preferred embodiment, the member extending through the valve housing comprises an elongate member.

Preferably, an inner portion of the member extending through the valve housing is engageable with the valve closure member or with a member which moves with the valve closure member.

The valve preferably further comprises a plate member secured to the valve closure member, with which the inner portion of the member extending through the valve housing is engageable.

By way of example only, specific embodiments of the present invention will now be described, with reference to the accompanying drawings, in which:

FIGS. 5 (a), (b) and (c) of perspective views of the shut-off valve of FIG. 1, illustrating insertion of an unexpanded compressed body and removal of the same body after exposure to liquid;

Figure 5:
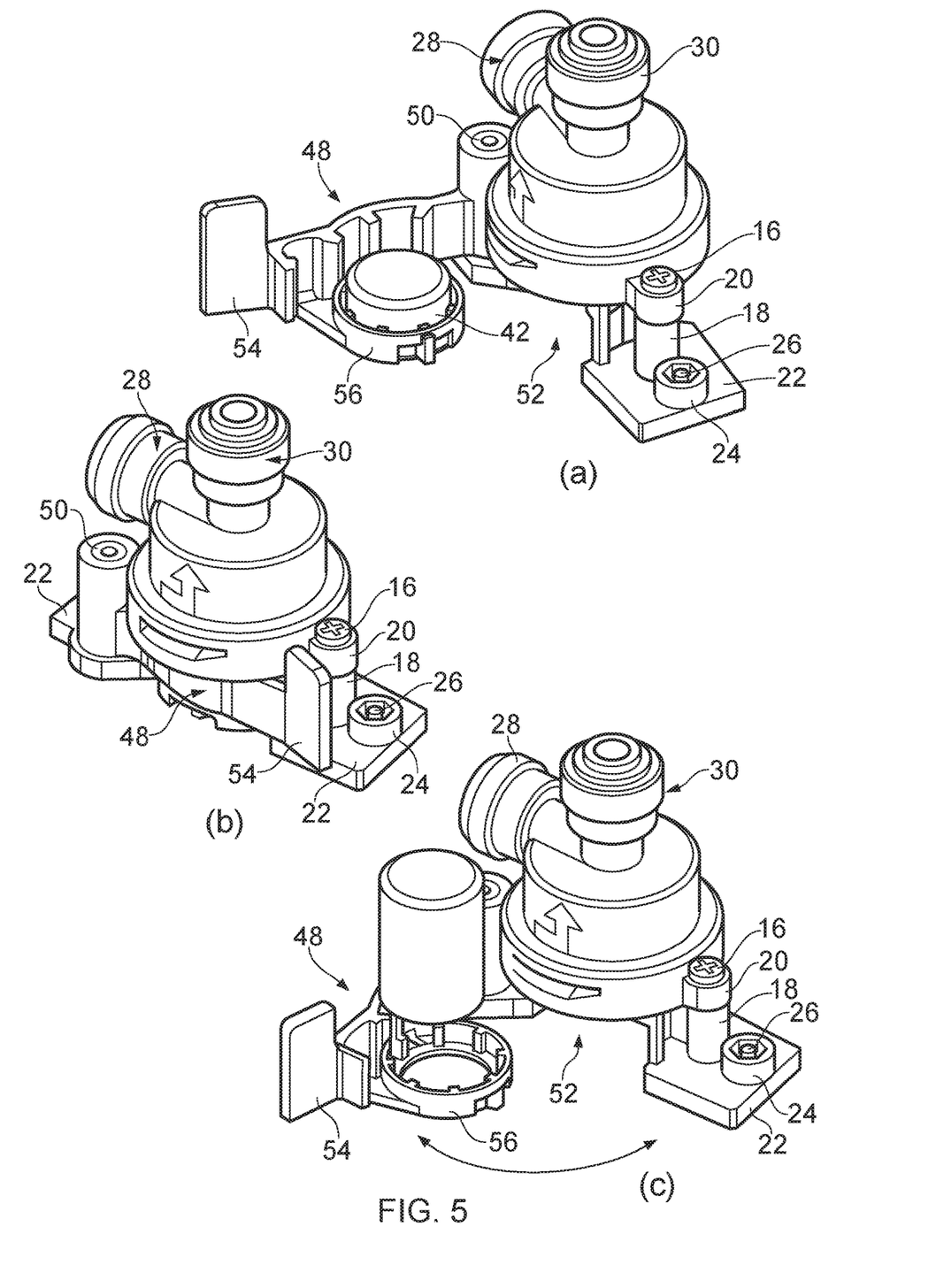
Figure 6:
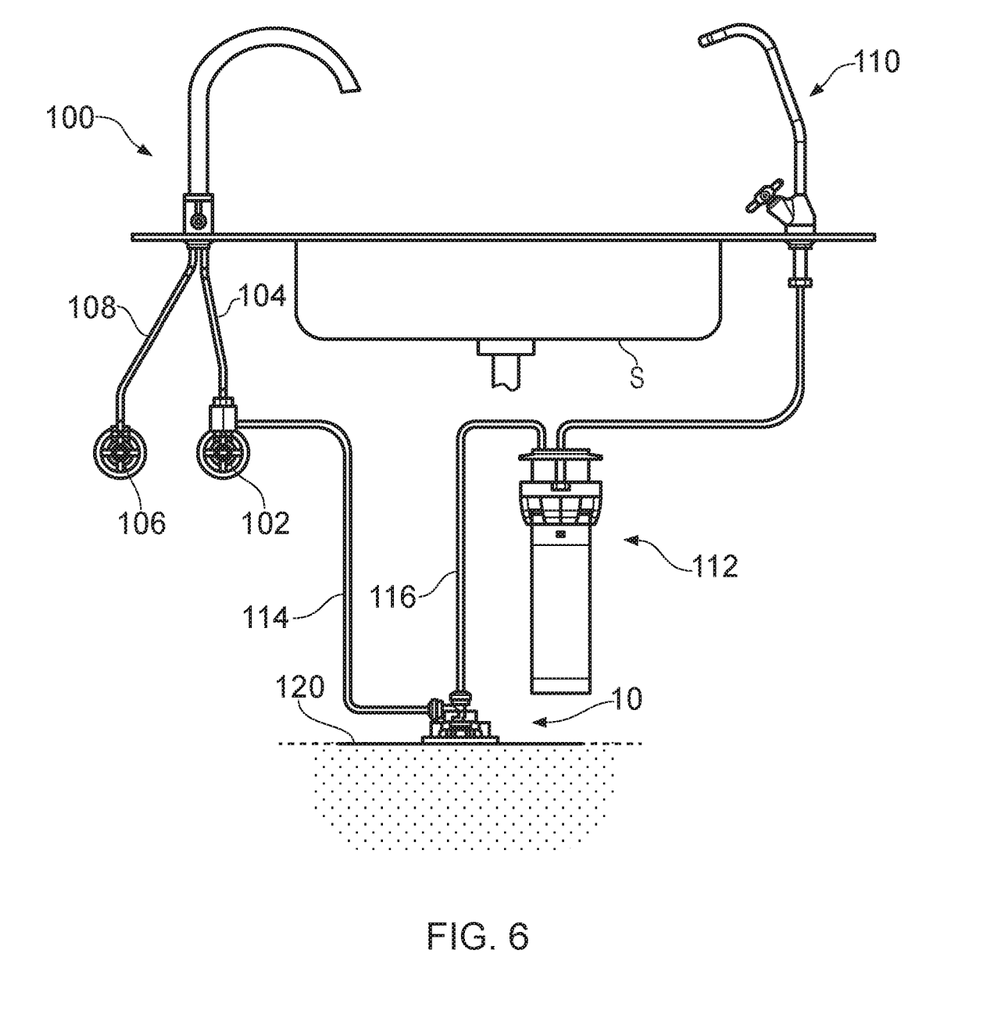
FIG. 6 is an illustration of an embodiment of shut-off valve in accordance with the present invention, as fitted to a water filter located beneath a sink

The first embodiment of shut-off valve 10 in accordance with the present invention as shown in FIGS. 1 to 5 is typically installed beneath a sink S, as shown in FIG. 6. A so-called mixer tap 100 is supplied with cold water from a cold water inlet 102 via a supply pipe 104 and is supplied with hot water from a hot water inlet 106 via a supply pipe 108. The cold water inlet 102 also provides water to a separate tap 110 for providing filtered water from a water filter 112.

Water from the cold water inlet 102 is fed via a second supply pipe 114 to the shut-off valve 10 and from the shut-off valve 10 to the water filter 112 via a third supply pipe 116. An outlet pipe 118 supplies water from the water filter 112 to the tap 110. As can be seen in FIG. 6, the shut-off valve 10 of the present invention is located between the second and third supply pipes 114, 116 below the level of the water filter 112. In the event of a leakage, the shut-off valve 10 is configured to shut-off the supply of water through the second supply pipe 114, as will be explained.

As shown in the Figures, the shut-off valve of FIGS. 1 to 5 comprises a largely hollow lower housing portion 12 and an upper housing portion 14 secured to the lower housing portion 12 by means of screws 16 passing through aligned apertured lugs 18, 20 on the lower and upper housing portions 12, 14 respectively. The lower housing portion 12 is also provided with two planar support feet 22 on which the shut-off valve rests, in use. The support feet 22 provided with apertured collars 24 for receipt of securing screws 26 for securing the shut-off valve 10 to a surface 120.

The upper housing portion 14 is provided with a laterally extending fluid inlet port 28 and a fluid outlet port 30 extending perpendicularly upwardly with respect to the fluid inlet port 28 from the top of the upper housing portion 14 and a L-shaped fluid flow passage 32 extends between the inlet port 28 and the outlet port 30. A plunger 34 is mounted in a bore 36 in the upper housing portion 14, the bore 36 being aligned with the fluid outlet port 30. The upper end of the plunger 34 carries an O-ring seal 38 by means of which the plunger is slidably and sealingly mounted in the bore 36. The opposite, lower end of the plunger is secured to a support plate 40 and is located within an internal volume of the largely hollow lower housing portion 12a. In use, the lower surface of the support plate 40 abuts the upper face of an absorbent compressed body 42 also located in the internal volume of the lower housing portion 12, as will be explained. The plunger 34 is displaceable along the bore 36 into the fluid flow passage 32 (into the position shown in dotted lines in FIG. 4), in which position it blocks the fluid flow passage 32, by expansion of the absorbent compressed body 42 on exposure to water, in which position it prevents fluid from passing from the inlet port 28 to the outlet port 30. However, the plunger 34 is biased away from the fluid flow passage 32 by means of a compression spring 44, extending between the upper surface of the support plate 40 and the undersurface of a mounting plate 46 mounted at the upper end of the lower housing portion 12.

As shown in the Figures, the lower housing portion 12 further comprises a reversibly openable side wall portion 48 which is pivotally mounted on a hollow cylindrical pivot lug 50 extending upwardly from one of the support feet 22. The side wall portion 48 is pivotable between an open position shown in FIGS. 5(a) and (c) in which it projects outwardly and allows access to the internal volume of the lower housing portion 12, and a closed position shown in FIG. 5(c) in which it fits flush with the rest of the lower housing portion 12 into an aperture or opening 52 in the side wall of the lower housing portion 12. Pivoting of the side wall portion 48 between the two positions is facilitated by a finger tab 54 at its end remote from the pivot.

As shown in the figures, an annular support 56 extends laterally inwardly from the inner face of the side wall portion 48, for receipt of a compressed cylindrical absorbent tissue body 42 to be positioned in the internal volume of the housing 10. As explained previously, the compressed absorbent tissue body 42 expands on contact with water, and displaces the plunger 34 into the fluid flow passage 32 to cut off the supply of water through the valve, as shown schematically in dotted lines in FIG. 4.

Figure 1:
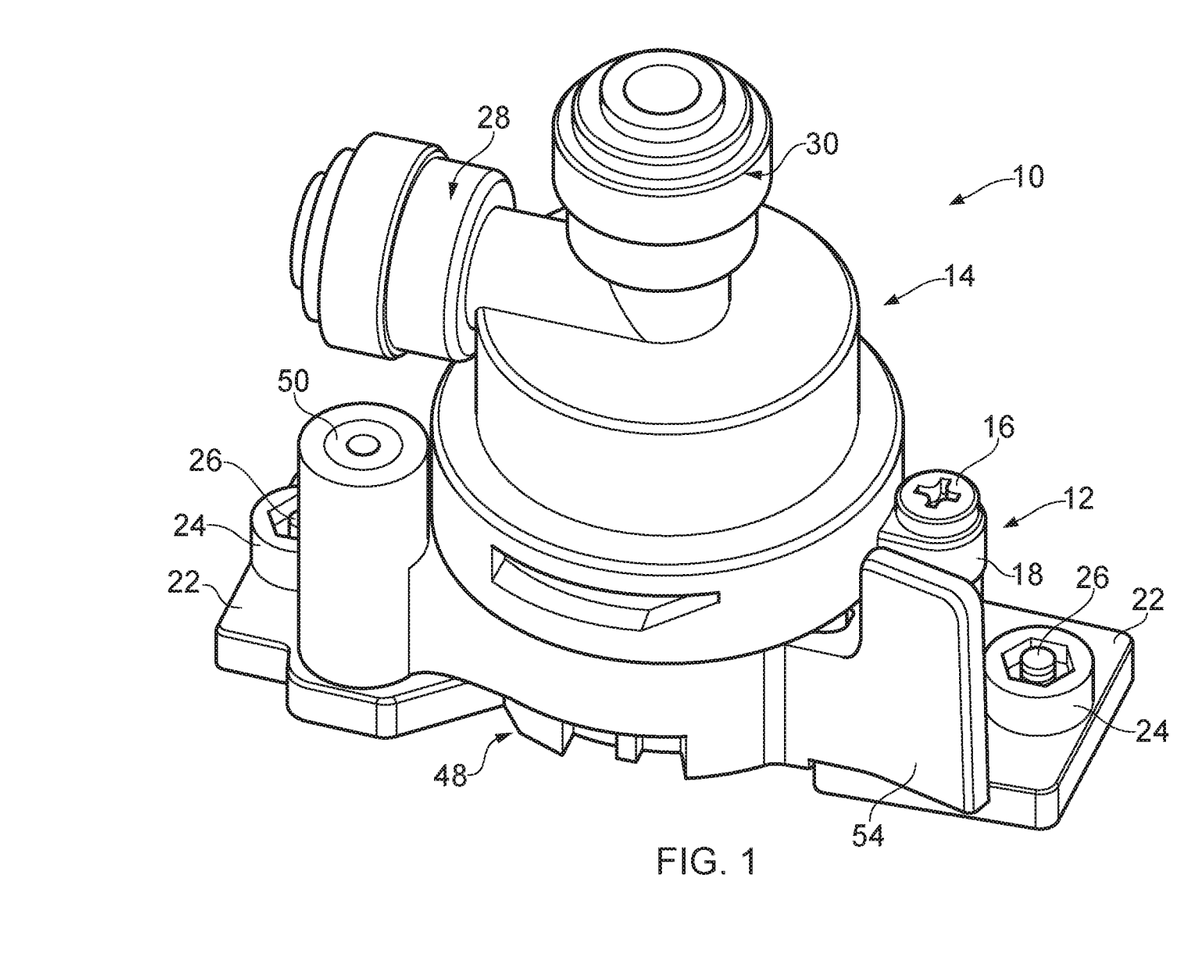
FIG. 1 is a perspective view from above of a first embodiment of shut-off valve in accordance of the present invention.
Figure 2:
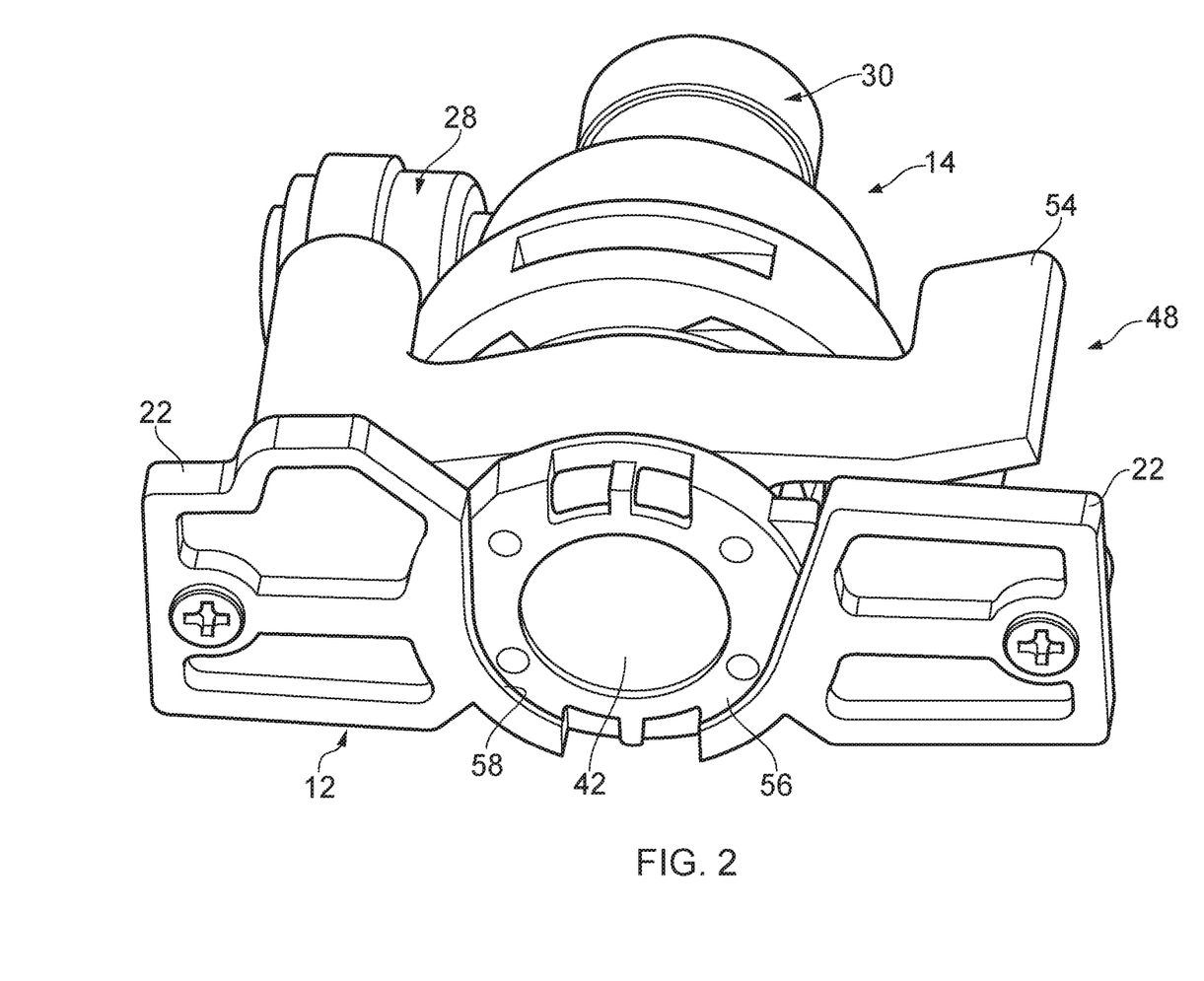
FIG. 2 is a perspective view from below of the shut-off valve of FIG. 1.
Figure 3:
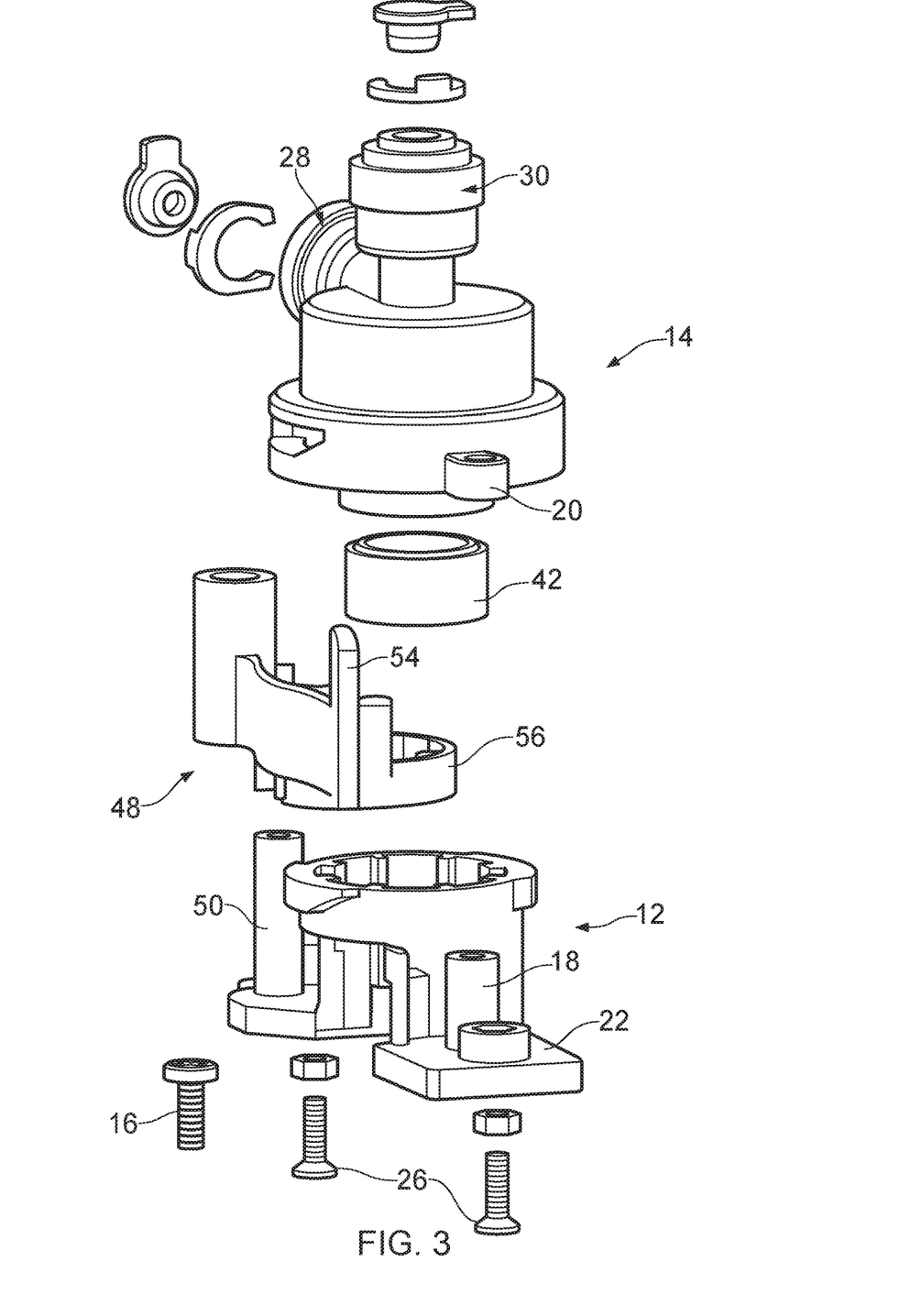
FIG. 3 is an exploded perspective view of the shut-off valve of FIG. 1.
Figure 4:
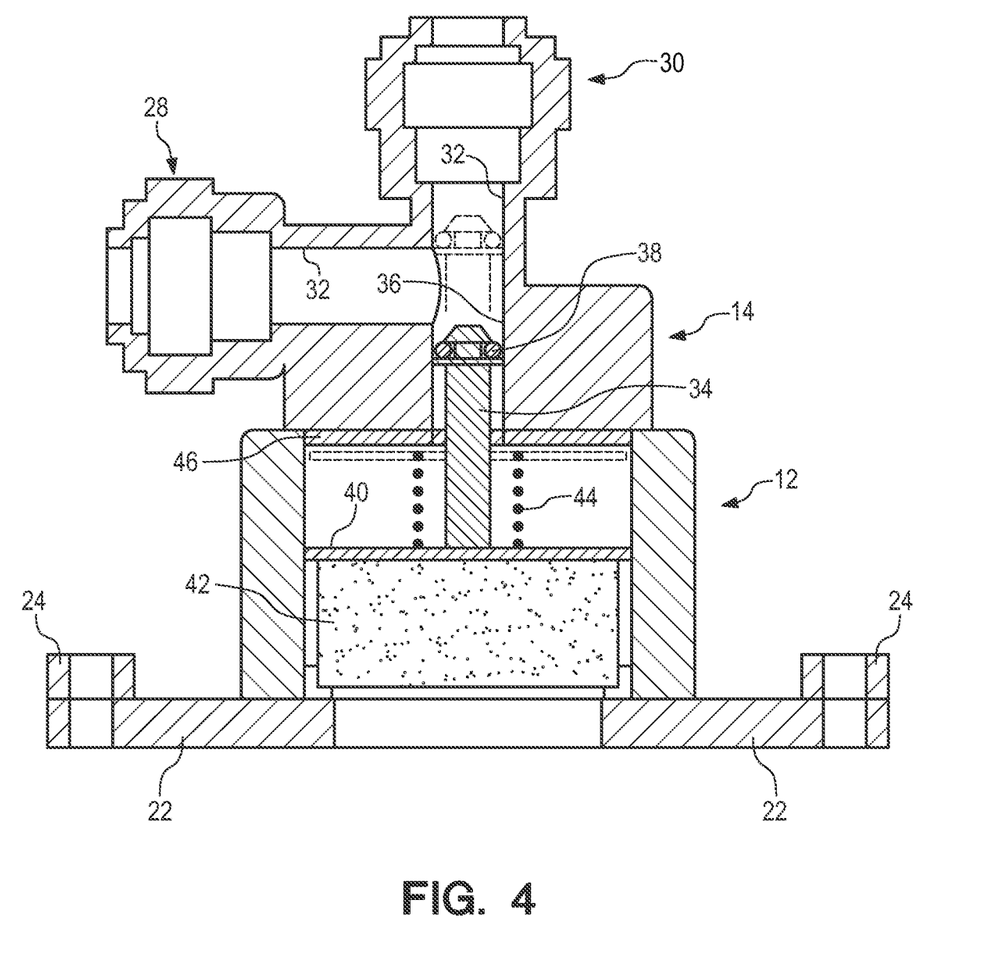
FIG. 4 is a vertical cross-section through the shut-off valve of FIG. 1.

It will also be observed that the undersurface of the lower housing portion 12 between the support feet 22 is open, to allow liquid to enter the internal volume of the housing and to come into contact with the undersurface of the compressed absorbent tissue body in the event of a leak. In fact, and as best seen in FIG. 2, the annular support 56 extending inwardly from the inner face of the pivotally mounted side wall portion 48 fits into a complementarily-shaped recess 58 in the undersurface of the lower housing portion 12. The complementary fit of the annular support 56 and the recess 58 in the undersurface of the lower housing portion 12 assists in retaining the wall portion 48 in a closed position. It also ensures that on expansion of the compressed absorbent tissue body, the undersurface of the tissue body does not come into contact with the surface on which the valve assembly is mounted, which might result in excessive force on the screws 26 retaining the valve in position. Instead, the reaction force arising from expansion of the compressed absorbent tissue is borne by the housing.

In use, and as shown in FIG. 5(a), the valve is secured to a surface 120 at a level where water will accumulate in the event of a leak, by means of securing screws 26 passing through the apertured collars 24 in the support feet 22. The supply pipe 114 from the water inlet 102 is then connected to the inlet port 28 and the further supply pipe 116 is connected between the outlet port 130 and the inlet of the fluid filter 112. The side wall portion 48 is pivoted to the open position shown in FIG. 5(*a*), a compressed absorbent tissue body 42 is placed on the annular support 54 and the side wall portion 48 is then pivoted to the closed position shown in FIG. 5(*b*).

In normal operation of the valve, the plunger 34 is biased away from the fluid flow passage 32 by means of the compression spring 44. Therefore, water entering the inlet port 28 is able to flow through the fluid flow passage 32 and out of the outlet port 30.

In the event of a leak, water collecting on the surface to which the valve housing is secured will enter the internal volume of the valve housing via the open base of the housing and will contact the undersurface of the compressed absorbent tissue body 42. When the water contacts the absorbent tissue body 42, the body expands upwardly in the internal volume, which forces the plunger 34 upwardly against the restoring force of the compression spring 44 such that the plunger 34 is displaced into the fluid flow passage 32 and isolates the inlet port 28 from the outlet port 30. Consequently, the supply of water from the cut-off valve 10 to the filter 112 is stopped.

When the leak has been fixed and the leaked water has been removed, the side wall portion 48 is pivoted outwardly, as shown in FIG. 5(*c*). The expanded absorbent tissue body 42 can then be removed and replaced with a new, unexpanded, compressed absorbent tissue body 42, as shown in FIG. 5(*a*). The side wall portion 48 can then be pivoted shut into the position shown in FIG. 5(*b*), whereupon the valve resumes its shut-off function.

The provision of the openable side wall portion 48 removes the need to dismantle the valve housing and subsequently reassemble it in order to replace an expanded absorbent tissue body 42 with a new, unexpanded, compressed absorbent tissue body.

A second embodiment of the present invention is illustrated in FIGS. 7 to 10.

The construction and operation of the second embodiment are very similar to those of the first embodiment, and corresponding features are identified with the same reference numerals as for the first embodiment. The valve of the second embodiment is shown with a known push-fit inlet connector IC of an inlet pipe (not shown) and a known push-fit outlet connector OC of an outlet pipe (not shown) connected to the fluid inlet ports 28 and fluid outlet port 30 respectively, but these do not form part of the present invention.

A first difference between the second embodiment and the first embodiment is that in the second embodiment the housing 12' is a one-piece housing, in contrast to that of the first embodiment which comprises lower and upper housing portions 12, 14 secured together by means of screws 16. The shape of the housing 12' is virtually identical to that of the housing of the first embodiment, having a lower, generally cylindrical base portion 12'*a* and a smaller diameter, upper, generally cylindrical upper portion 12'*b*. From a manufacturing point of view, the housing of the second embodiment may conveniently be formed initially from two separate lower and upper housing portions which are then permanently secured together to form a one-piece housing. In this embodiment, the two housing portions are secured together by means of a one-way snap fix (not visible in the drawings) with four ramped claws on the upper portion 12'*b* being permanently received in corresponding slots in the base portion 12'*a*, but other methods of permanently securing the two portions together to form a one-piece housing 12 can be used.

Figure 7:
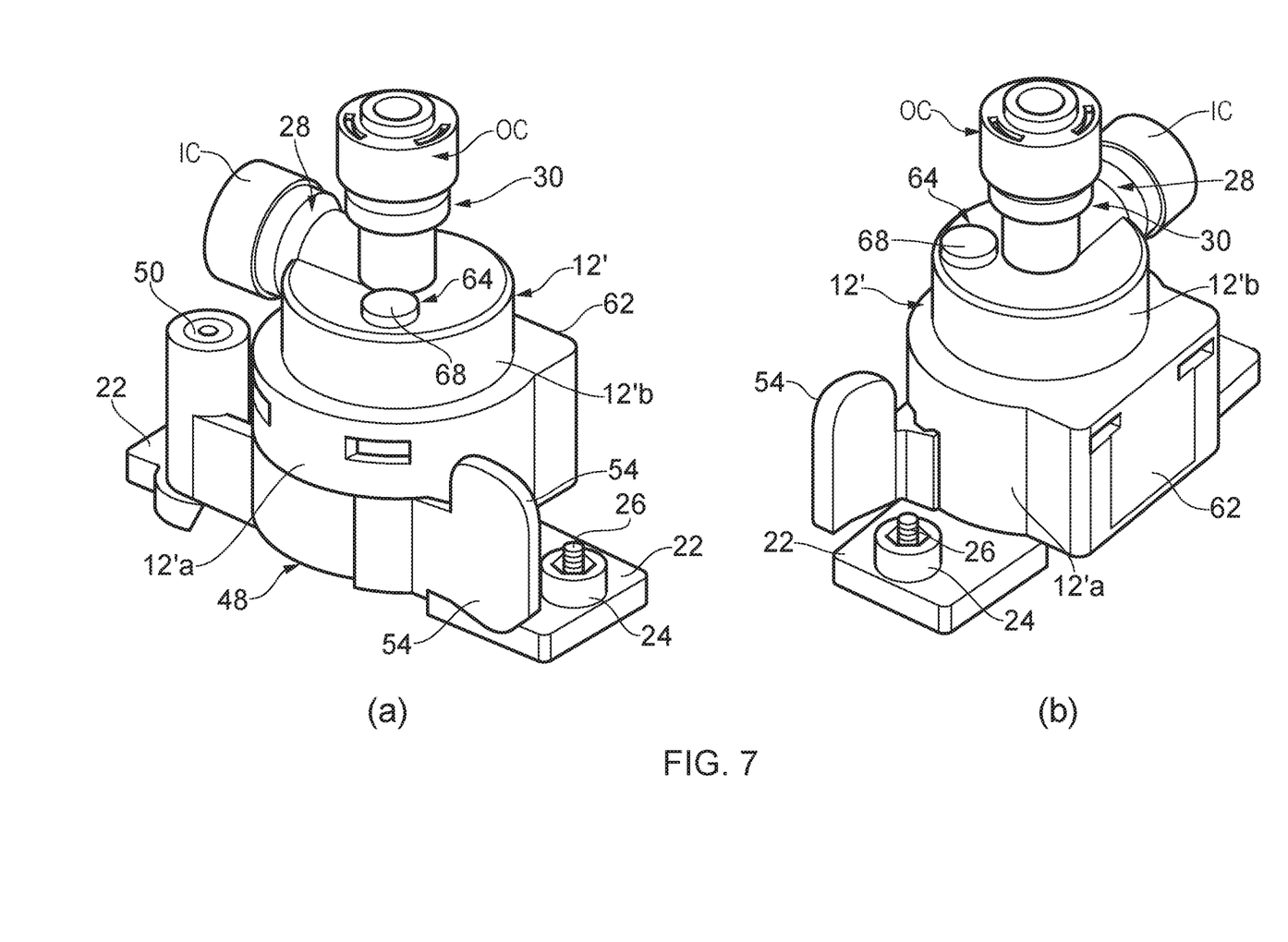
FIGS. 7(a) and 7(b) are perspective views from above of a second embodiment of shut-off valve in accordance with the present invention, shown in an operative condition.
Figure 8:
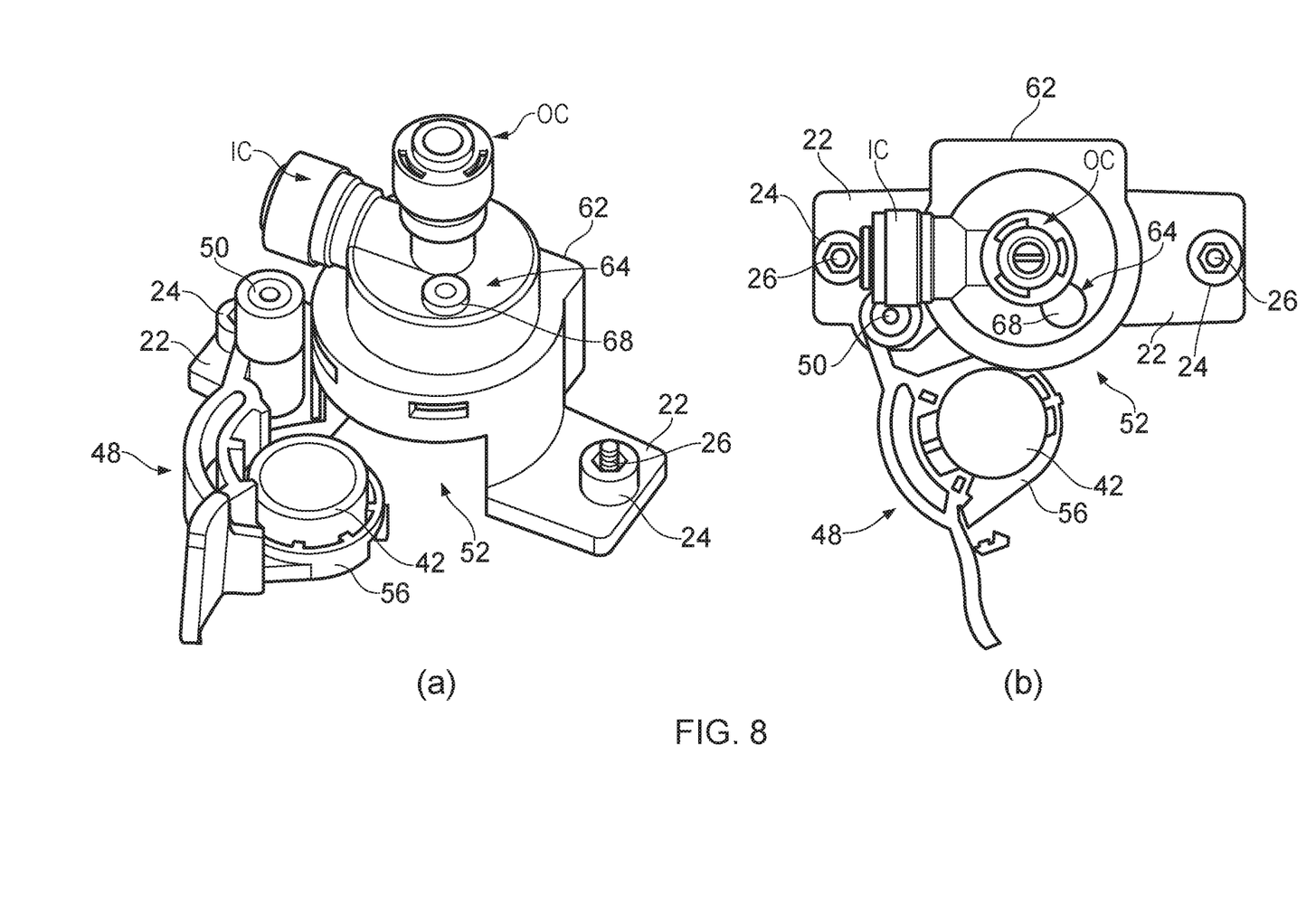
FIGS. 8(a) and 8(b) are a perspective view and a view from above respectively of the shut-off valve of FIG. 7, illustrating the insertion of a compressed absorbent body.
Figure 9:
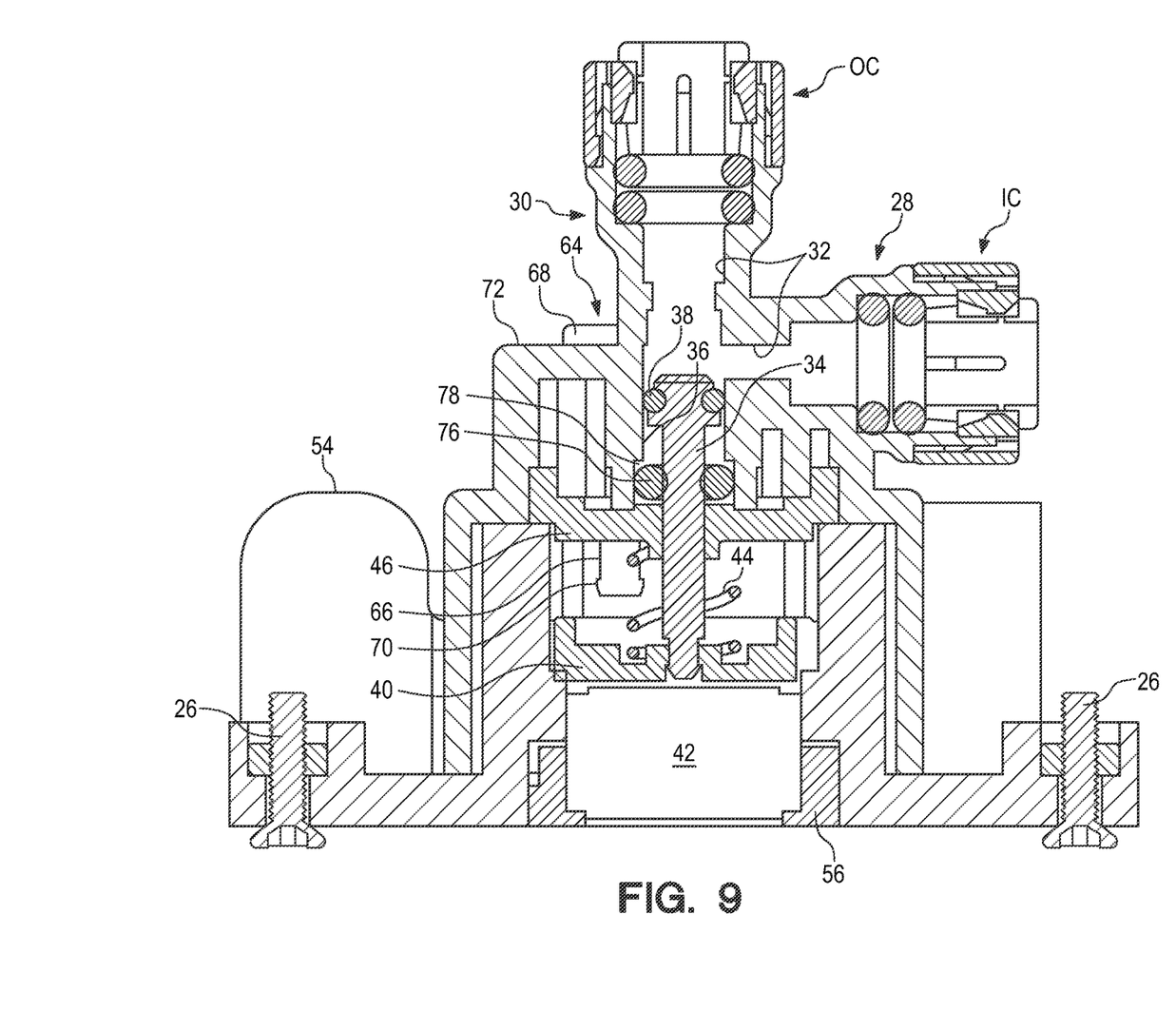
FIG. 9 is a vertical cross-section through the valve of FIG. 7, shown in an opened condition in which fluid is permitted through the valve.
Figure 10:
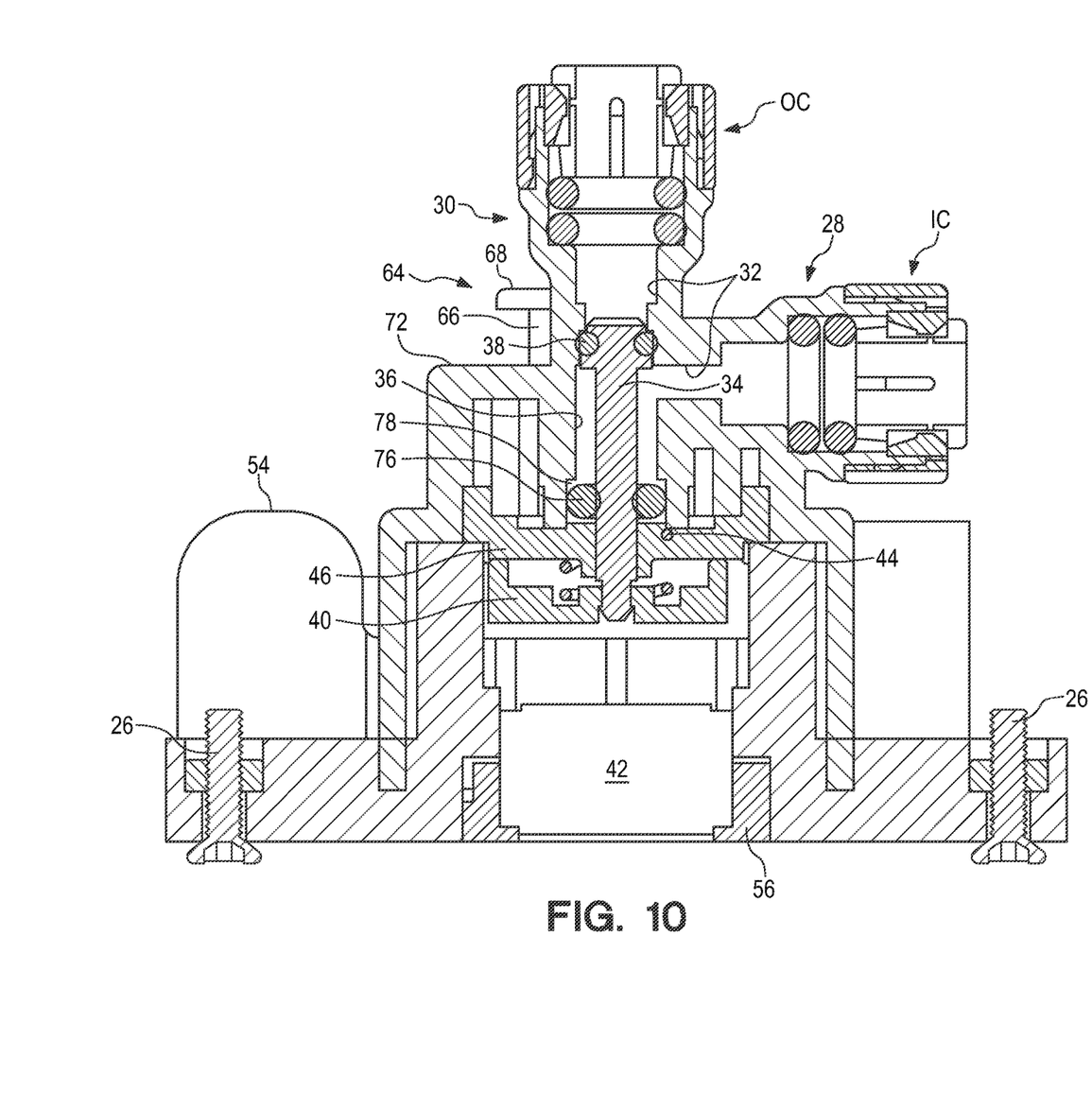
FIG. 10 is a vertical cross-section through the valve of FIG. 7, shown in a shut-off condition in which fluid is prevented from flowing through the valve.

As for the first embodiment, the housing 12' comprises a reversibly openable side wall portion 48 allowing access to an internal volume of the housing, the side wall being pivotally mounted on a hollow cylindrical pivot lug 50 extending upwardly from one of the support feet 22, and being pivotable between an open position shown in FIG. 8 in which it projects outwardly and a closed position shown in FIG. 7 in which it fits flush with the rest of the housing 12' into an aperture or opening 52 in the side wall of the housing 12'. As in the first embodiment, an annular support 56 extends laterally inwardly from the inner face of the side wall portion 48, for receipt of a compressed cylindrical absorbent tissue body 42. The opposite side of the housing from the side wall portion 48 is formed into a flat face 62 which a Very High Bond (VHB) adhesive pad can be secured, to assist in securing the valve assembly to a vertical wall instead of, or in addition to, using screws 26 passing through the apertured collars 24 of the support feet 22.

The second embodiment also further comprises a reset plunger 64 which assists in repositioning the plunger 34 to the withdrawn position in which fluid is permitted to flow through the valve between the inlet ports 28 and the outlet port 30.

Figure 11:
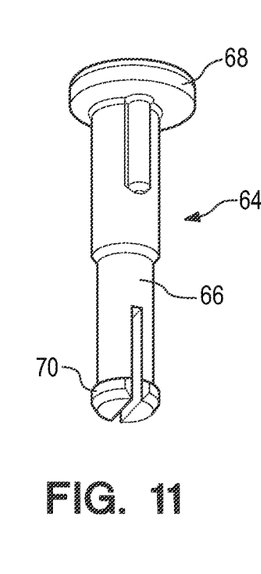
FIG. 11 is a perspective view of a reset plunger which forms part of the valve of FIG. 7.

The reset plunger 64 comprises a cylindrical body portion 66 having an enlarged head portion 68 at its upper, outer end and a circumferential rib 70 adjacent to its lower, inner end.

The cylindrical body portion 66 passes sealingly through a complementarily-shaped aperture in a flat upper wall 72 of the housing 12'. The plunger is movable between a depressed position shown in FIG. 9, in which the enlarged head portion 68 is engaged with the flat wall 72 and the lower end of the plunger is located immediately above the support plate 40, and an extended position shown in FIG. 10 in which upward movement of the support plate 40 engages the lower end of the reset plunger 64 and displaces it so that it projects from the flat wall 72 of the housing. The circumferential rib 70 at the lower, inner end of the cylindrical body portion 66 prevents the plunger 64 from being displaced completely out of the housing 12'. The reset plunger 64 can be depressed manually towards the position shown in FIG. 9 to assist in resetting the valve, in the event that it becomes stuck in the shut-off position.

It will also be observed that an additional O-ring seal 76 is secured in the wall 36. The seal 76 is in sealing engagement with the plunger 34 and is retained between the mounting plate 46 and an annular shoulder 78 in the bore 36.

The construction and operation of the second embodiment are otherwise identical to construction and operation of the first embodiment.

The invention is not restricted to the details of the foregoing embodiments.

What is claimed is:

1. A shut-off valve comprising a valve housing having a valve inlet, a valve outlet, a fluid flow channel extending between the valve inlet and the valve outlet, a valve closure member displaceable into the fluid flow channel to prevent fluid flow through the flow channel and a volume within the housing for receiving a compressed absorbent body which expands when in contact with liquid and which is configured to displace the valve closure member into the fluid flow channel when expanded, the housing being configured to be secured to a surface and comprising a reversibly closable aperture which allows access to the volume for replacing the compressed absorbent body when the housing is secured to the surface, wherein the housing comprises a side wall portion which is displaceable for opening and closing the aperture, wherein the displaceable side wall portion comprises an annular support that extends laterally inwardly from the side wall portion for supporting the compressed absorbent body.

2. A shut-off valve as claimed in claim 1, wherein the annular support is configured to engage the periphery of the compressed absorbent body.

3. A shut-off valve as claimed in claim 1, wherein the side wall portion is pivotally mounted.

4. A shut-off valve as claimed in claim 1, wherein the undersurface of the housing is open.

5. A shut-off valve as claimed in claim 1, wherein the undersurface of the housing is open and wherein the displaceable side wall portion is complementarily-shaped with the open portion of the undersurface of the housing.

6. A shut-off valve as claimed in claim 1, comprising biasing means for biasing the valve closure member away from the fluid flow channel.

7. A shut-off valve as claimed in claim 6, wherein the biasing means comprises a spring.

8. A shut-off valve as claimed in claim 1, wherein the valve closure member comprises a plunger.

9. A shut-off valve as claimed in claim 8, wherein the plunger is slidably disposed in a bore in the housing.

10. A shut-off valve as claimed in claim 1, further comprising a plate member secured to the valve closure member.

11. A shut-off valve as claimed in claim 1, wherein the valve housing comprises upper and lower housing portions.

12. A shut-off valve as claimed in claim 11, wherein the upper housing portion is secured to the lower housing portion.

13. A shut-off valve as claimed in claim 12, wherein the valve inlet, the valve outlet and the fluid flow channel are located in the upper housing portion.

14. A shut-off valve as claimed in claim 12, wherein the volume for receiving the compressed absorbent body and the closable aperture are in the lower housing portion.

15. A shut-off valve as claimed in claim 1, wherein the valve housing comprises a single housing portion.

16. A shut-off valve as claimed in claim 1, further comprising means for displacing the valve closure member out of the fluid flow channel.

17. A shut-off valve as claimed in claim 16, wherein the means for displacing the valve closure member out of the fluid flow channel comprises a member extending through the valve housing and displaceable with respect to the valve housing.

18. A shut-off valve as claimed in claim 17, wherein the means for displacing the valve closure member is displaceable manually.

19. A shut-off valve as claimed in claim 17, wherein the member extending through the valve housing is displaced outwardly on displacement of the valve closure member into the fluid flow channel.

20. A shut-off valve as claimed in claim 17, wherein an inner portion of the member extending through the valve housing is engageable with the valve closure member or with a member which moves with the valve closure member.

21. A shut-off valve as claimed in claim 20, further comprising a plate member secured to the valve closure member, with which the inner portion of the member extending through the valve housing is engageable.

* * * * *